United States Patent
Davydov (10) Patent No.: US 8,571,282 B2
(45) Date of Patent: Oct. 29, 2013

(54) METHOD AND APPARATUS FOR MEASURING SPINAL CHARACTERISTICS OF A PATIENT

(76) Inventor: Albert Davydov, Forest Hills, NY (US)

( * ) Notice: Subject to any disclaimer, the term of this patent is extended or adjusted under 35 U.S.C. 154(b) by 621 days.

(21) Appl. No.: 12/881,411

(22) Filed: Sep. 14, 2010

(65) Prior Publication Data

US 2011/0157230 A1     Jun. 30, 2011

Related U.S. Application Data

(60) Provisional application No. 61/290,115, filed on Dec. 24, 2009.

(51) Int. Cl.
  *G06K 9/00*     (2006.01)
(52) U.S. Cl.
  USPC ............................ 382/128; 382/154; 600/594
(58) Field of Classification Search
  None
  See application file for complete search history.

(56) References Cited

U.S. PATENT DOCUMENTS

| | | | |
|---|---|---|---|
| 5,514,180 A * | 5/1996 | Heggeness et al. | 623/17.16 |
| 6,468,233 B2 * | 10/2002 | Cook | 600/594 |
| 7,231,073 B2 * | 6/2007 | Tanaka | 382/128 |
| 7,309,357 B2 * | 12/2007 | Kim | 623/17.13 |
| 7,542,791 B2 * | 6/2009 | Mire et al. | 600/407 |
| 7,976,568 B2 * | 7/2011 | Cheung et al. | 606/279 |
| 8,055,046 B2 * | 11/2011 | Feilkas et al. | 382/131 |
| 8,059,878 B2 * | 11/2011 | Feilkas et al. | 382/131 |
| 8,126,234 B1 * | 2/2012 | Edwards et al. | 382/128 |
| 8,126,240 B2 * | 2/2012 | De Bruijne et al. | 382/131 |
| 8,126,249 B2 * | 2/2012 | Brett et al. | 382/132 |
| 8,187,328 B2 * | 5/2012 | Melkent | 623/17.11 |
| 2003/0086596 A1 * | 5/2003 | Hipp et al. | 382/128 |
| 2003/0215122 A1 * | 11/2003 | Tanaka | 382/128 |
| 2006/0122483 A1 | 6/2006 | Foley et al. | |
| 2006/0133694 A1 | 6/2006 | Dewaele | |
| 2008/0199060 A1 | 8/2008 | Boyden et al. | |
| 2009/0285466 A1 | 11/2009 | Hipp et al. | |
| 2010/0128953 A1 * | 5/2010 | Ostrovsky-Berman | 382/131 |

FOREIGN PATENT DOCUMENTS

EP     1 180 352 A1     2/2002

OTHER PUBLICATIONS

Craig Uejo, MD, MPH et al, Spine Impairment Evaluation:Sixth Edition Approaches, The Guides Newsletter, Jan./Feb. 2009, 75th issue, American Medical Association, Atlanta, GA.
International Search Report & Written Opinion, ISA/US, Jan. 27, 2011.

* cited by examiner

*Primary Examiner* — Manav Seth
(74) *Attorney, Agent, or Firm* — Anna Vishev, Esq.

(57) ABSTRACT

In a system for analyzing the spine of a patient, an X-ray is taken at one location, and the resulting X-ray image is transmitted to a remote location. At the remote location, the raw image is presented to a user who then selects some of the vertices of a polygon approximating the shape of the vertebrae in the X-ray. A processor is then used to calculate the position of the remaining vertices. The idealized shapes are then used to generate a report indicative of the spine. If necessary, a positioner is placed on the patient while the X-ray is taken and the image of the positioner is used to determine an angle of distortion of the vertebrae image and a scaling factor that can be used to determine the actual size of the vertebrae and the spatial spinal segmental relationship.

16 Claims, 6 Drawing Sheets

METHOD AND APPARATUS FOR MEASURING SPINAL CHARACTERISTICS OF A PATIENT

RELATED APPLICATION

This application claims priority to provisional application Ser. No. 61/290,115 filed on Dec. 24, 2009 and incorporated herein by reference.

BACKGROUND OF THE INVENTION

A. Field of Invention

This invention pertains to a method for providing an accurate representation of a person's spine, and more particularly to the relative and absolute positions of the individual vertebrae of the spine based on images thereof. The invention further pertains to an apparatus for the obtaining said representation.

B. Description of the Prior Art

Various kinds of illnesses can be traced to deformations in the spines of patients. In order to obtain a prognosis for such illnesses, for many years standard practice has been to obtain images of the spines of patients and the visually inspect these images and review the patients' medical histories. Typically, deformations of the spine can be a result of a congenital condition, or can result from a severe trauma suffered during an automotive accident, a fall, a physical altercation, etc. Unfortunately, until now there was very little quantitative information available from such images (normally obtained from x-rays at several different angles with the patient standing or seating) and therefore a physician had to rely on anecdotal evidence and his years of experience to make a reasonably accurate prognosis.

Recently the American Medical Association (AMA) got into the act and issued their new Guides to the Evaluation of Permanent Impairment, $6^{th}$ Edition in 2008. These guidelines require the medical field to adjust its procedures for specific standards of patient's/client's care. For most of the medical and legal practices these changes are difficult because there is no available technology to accommodate such changes. The present application addresses these issues at least as they relate to the evaluation and prognosis of spine-related matters.

More specifically, The Guides to the Evaluation of Permanent Impairment by the AMA (Sixth Edition) includes an Alteration of Motion Segment Integrity quantification. AMSI is included in calculation of impairment ratings and is as follows:

"A diagnosis of AOMSI in the cervical spine by translation measurements requires greater than 20% anterior or greater 20% posterior relative translation of one vertebra on another, on flexion or extension radiographs, respectively; or angular motion of more than 11 degrees greater than each adjacent level on the flexion radiograph." Page 578 $6^{th}$ AMA Guides.

"A diagnosis of AOMSI in the thoracic spine by translation measurements requires at least 2.5 mm anterior or 2.5 mm posterior translation of one vertebra on another, on flexion or extension radiographs respectively; or successful or unsuccessful attempts at surgical arthrodesis, including dynamic stabilization." Page 578 $6^{th}$ AMA Guides.

"A diagnosis of AOMSI in the lumbar spine (L1-L5) by translation measurements requires greater than 8% anterior or greater than 9% posterior relative translation of one vertebra on another on flexion or extension radiographs respectively." Page 579 AMA Guides.

"In the lumbosacral spine (L5-S1), it requires greater than 6% anterior or greater than 9% posterior relative translation at L5-S1 of L5 on S1 on flexion or extension radiographs, respectively. A diagnosis of AOMSI in the lumbosacral spine by angular motion measurements requires greater than 15 degrees at L1-2, L2-3, and L3-4; greater than 20 degrees at L4-L5, or greater than 25 degrees at L5-S1 (compared with adjacent level angular motion)" Page 579 $6^{th}$ AMA Guides.

Since it is so much time consuming and inaccurate, as well as inter-operator inaccurate (if it is done with a ruler and a pencil) the measurements are always subject to significant errors. Various solutions have been suggested to perform the calculations using automated means, however, the inventor has found that all of these suggestions suffer from one or more of the following short comings:

After extensive studies with different models numerous inborn flaws were found, specifically:

a) Lack of precision due, for example, to changes in magnification of images and angular optic distortions;

b) Improper segmental quantifications c) Are not updated with the new standards set forth by the AMA $6^{th}$ Edition d) many unnecessary features included in some of the devices make the devices difficult and cumbersome to use;

e) improper angle quantification due to magnification and optical angular distortion of the image as well as improper geometrical point designation;

f) invalid claims of calculation of the impairment rating g) illegally sold devices are not be cleared by the FDA for sale (DX Analizer Professional), but presently sold have numerous inherent software flaws;

The apparatus and method disclosed here in overcomes all these problems.

SUMMARY OF THE INVENTION

The present invention pertains to a method and apparatus for analyzing and diagnosing the spine of a patient. The patient is positioned before an X-ray source, and several X-rays are taken of the spine using the methodology used below. Preferably, the X-rays are digitized (if necessary) and sent to a remote location electronically where the analyses takes place.

Briefly, the invention makes use of a process in which it is assumed that the vertebra at various sections have a known shape, for example, a rectangle, a triangle, etc. The process works as follows:

1. A reference object is attached to the back of the patient, adjacent to the relevant spine section at a specific location on the back. The reference object includes a plate having a known width, length and depth, positioned as much as perpendicularly to the axis of the X-rays and to the horizontal axis of an electronic compass that provides information about the orientation of the plate in three different directions in terms of respective angles, which enables the radiologist a) properly position the patient as well as possible, b) in case of any deviation from the ideal angle between the x-ray and the position of the patient, the angles of the distortion are determined from the compass and recorded together at the time when the corresponding X-ray image is taken.

2. The radiologist positions the patient so that the patient's spine is at a substantially 90 degrees with respect to the X-ray beam.

3. The X-ray beam is directed at the relevant spine section and the reference object. Two sets of X-ray images are obtained with the patient holding his head in two different positions—flexion and extension, as required by the medical standard. The resulting images are than scanned and sent electronically as an Image Set to a remote location together with the corresponding readings of the compass showing three offset angles by which the plate (and therefore the spine) deviated from the ideal orientation while the X-ray images were recorded. The Image Set includes specific patient's information, as well.

3. At the remote location, a microprocessor takes these three deviation angles and manipulates the x-ray image data of the reference object's plate to compensate for these deviations. The image will be transformed according to the 3D transformation coefficient of the plate. The size of the plate is known a priori and therefore it is used to provide scaling information, so that after data transformation, not only the actual orientation, but also the size of each vertebra is known.

4. The corrected images of the spine are presented to a technician. The technician then selects the n points for each of the vertebral body corresponding to the n vertices of an idealized shape for the respective vertebra, where the idealized shape has n+1 vertices. The microprocessor then selects the position of the n+1th vertex of the shape. The order of points is important to follow for precision in calculations of the AOMSI (Alteration of Motion Segment Integrity). If the order of points is not followed the desirable quadrangle will not be drawn, thereby preventing the operator of the errors made. The idealized shapes depend on the particular vertebra being analyzed. For most vertebra, it is a rectangle. However, the occiput has only a single dimension, and only its angle of rotation is of interest.

Once the absolute and relative positions and sizes of each vertebra is within a section is known, a set of predetermined rules is used to analyze the spine (or at least the respective section of the spine) and generate a respective diagnosis.

DETAILED DESCRIPTION OF THE PRIOR ART

The spine consists of a series of vertebrae and interconnecting tissues disposed and arranged along the length of the skeleton mammals. In humans, the cord assumes several curvatures and is partitioned along these curvatures into four regions, cervical, thoracic, lumbar, and lumbar-sacral. The vertebrae of the different regions (and sometimes, even within the same region), have different shapes and sizes.

Damage caused either by sudden impact to the spine either vertically along its axis or laterally, congenital defects, or certain diseases can cause the vertebrae to deform or even portions thereof to break off, causing discomfort or pain to the patient, and impairing his ability to bend and move his body. Moreover, lateral translational (rather than rotational) traumatic forces between adjacent vertebrae may cause the internal channels of adjacent vertebrae to be offset to the point where the spinal cord passing therethrough can be damaged, or even severed, resulting in major health problems to the patient, such as loss of the ability to move or sense the body part/s.

The present invention provides a means of determining of measuring the dimensions and relative positions of the various vertebrae with respect to each other utilizing a plain X-ray image/s. This information is then available as a means of assessing the condition of a patient.

More specifically, the shape and position of the vertebrae are determined from X-ray images. Once each vertebra is identified on an image, and processed within the device, the automated software that is a part of a device is used to analyze the spine or at least a region thereof, and, using this analysis, to generate a diagnosis for the patient. A problem plaguing this analysis until now has been that each vertebrae is specific to the size of the patient and images taken have magnification and orientation distortions occurring because of the relative positions of the X-ray beam source, the patient and the X-ray image recorder (film), and as a result, the exact shape, size and position relative to another vertebra is difficult to determine accurately from conventional X-ray images Obviously, any errors in determining the shape, orientation and size of a vertebra may result in an erroneous diagnosis, treatment and a prognosis of a disease.

A further problem in detecting the shape, size and position of vertebrae exactly is that the spinal vertebra and the actual shape of the whole spine can look quite different and can change from person to person based on a large number of factors such as age, sex, injuries and pathological changes in the vertebra and the spine itself.

Figure 1:
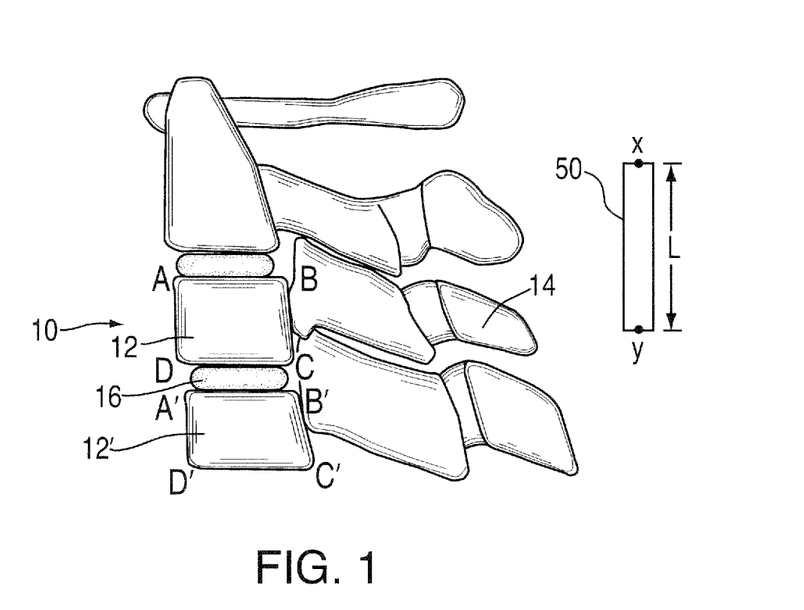
FIG. 1 shows a somewhat idealized side view of a portion of the cervical spine.

A typical vertebrae 10, as illustrated in a somewhat idealized manner from the side in FIG. 1, includes a body 12 that is tubular and somewhat rectangular shape when viewed from the side on a lateral X-ray image. Ideally all the vertebrae are lined up so their individual channels form a passageway for the spinal cord (not shown). Extending rearwardly of the body 12, each vertebra 10 has a bony extension 14 known as the spinous processus (Latin singular: Processus Spinosus). Some of the vertebrae also have lateral extensions (Latin Singular: processus transversus) that are connected to the ribs forming a person's rib cage. However, these lateral extensions have been omitted for the sake of simplicity. The vertebrae are separated by a soft, somewhat gelatinous tissue known as the disc 16. The discs 16 are normally flexible to allow one vertebrae to flex or pivot with respect to the adjacent vertebrae and this action provides a person the ability to bend his body in different directions as required.

Figure 2:
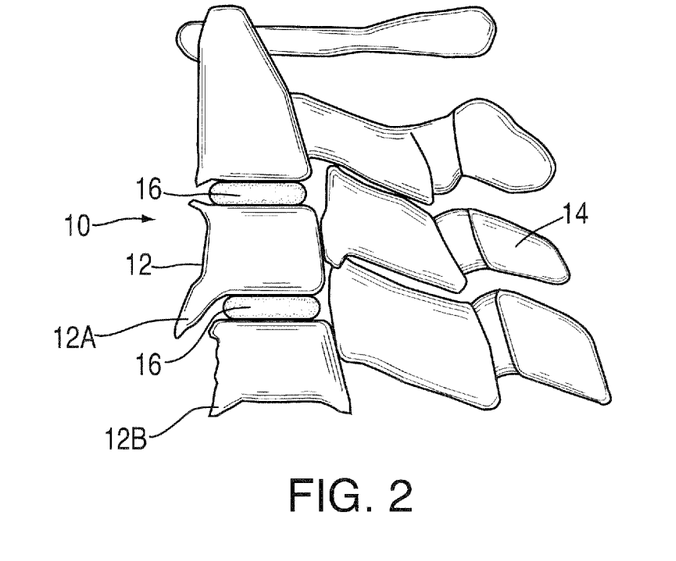
FIGS. 2 and 3 show diagrammatic, but more realistic views similar to the one in FIG. 1 but with several of the vertebrae having spurs and other irregularities.
Figure 3:
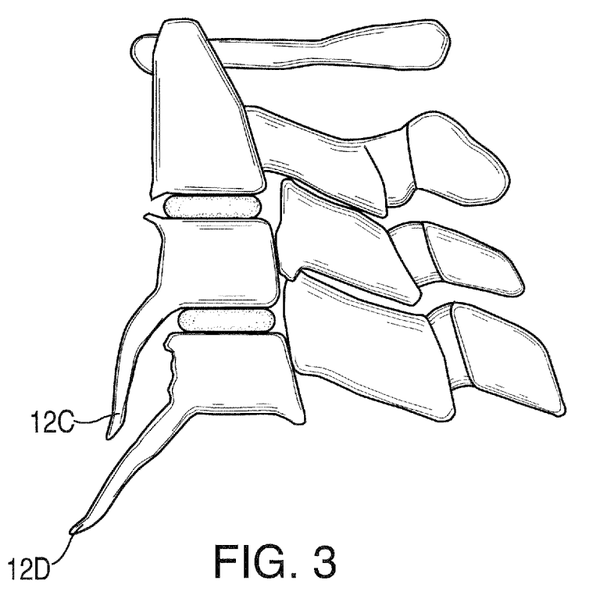
Figure 5:
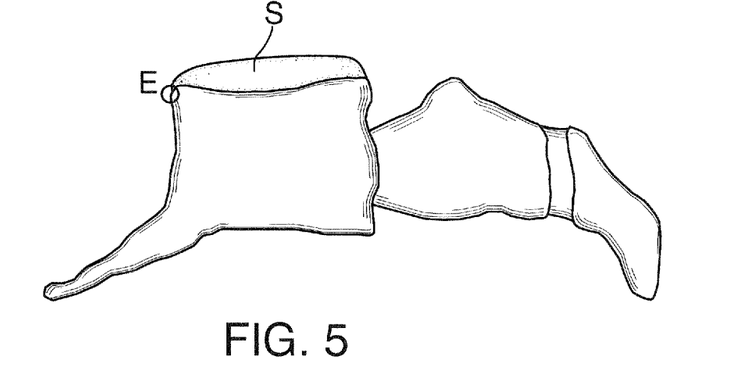
FIG. 5 shows an isometric view the outline of an actual vertebrae.

In reality, a vertebral body can never look on a lateral X-ray image as a rectangle, but has a multi-angular shape, as illustrated in FIGS. 2 and 3, with spurs 12A, 12B, 12C or 12D. Moreover, without compensation, the top or bottom surface of a vertebra may also be visible as shown in FIG. 5 at S. That is why the determination of the exact position, size and shape of the vertebrae becomes a real challenge since determining these parameters using a pencil and ruler appears to be nearly impossible.

The present invention resolves this problem by first idealizing all the vertebrae as a preselected regular geometric shape. As it will become apparent below, the actual shape is no longer that important as long as an appropriate idealized shape is selected consistently.

Figure 4:
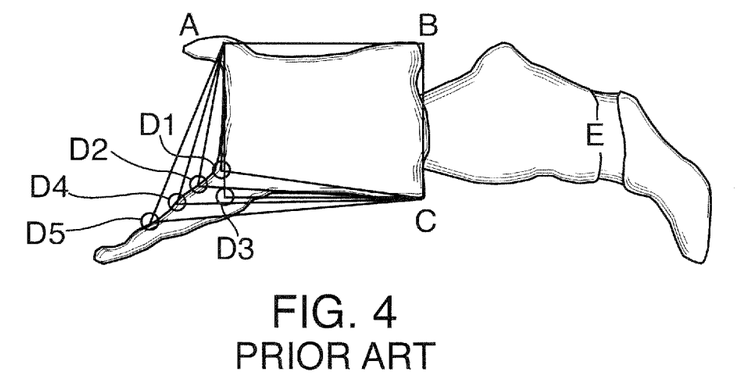
FIG. 4 shows a prior art technique of selecting manually the corners of a geometric shape approximating the shape of a vertebra.

A method for analyzing the spine has been previously suggested in which an image obtained of a vertebra is projected or depicted on a PC monitor, a preselected shape is designated and then an operator picks the corners of the preselected shape by hand. See the DX Analyzer by International Diagnostic Technologies, as described at www.dxanalyzer.com. There are several problems associated with this approach. One of the major problems is that the system is utilizing a five point analysis for a square vertebral body and triangular vertebral body and if a single person reviews all the x-ray images, and, especially, if he does this exercise many times, he will develop some expertise so that he will pick the points fairly consistently. However, when one person picks the corners for image and a second person picks the corners for the same or a different image, invariably the chosen locations of these corners, to a large extent, arbitrary. For example, referring to FIG. 4, due the spur in the vertebrae, a person may pick the same positions for corners A, B and C and he may pick any one of the five positions D1, D2, D3, D4 or D5 as the fourth corner D. Or one person may pick D1, another person may pick D2, and so forth. In other words, because the choice of all the corners is somewhat arbitrary, and there is a need for accuracy, the prior art method cannot be used consistently or with any kind of reliable repeatability.

Another problem is that the DX Analyzer does not solve the distortion problems due to magnification and orientation. Although an operator is preselecting the source of X-rays and film distance, it does not specify the position of the patient in relation to the source of X-rays and the film. If the patient is standing closer to the X-ray source the image on the film will appear larger than normal, and if the patient is standing closer to the film, the image will appear closer to the normal size. Moreover, if he does not stand completely straight and/or not facing in a direction that is exactly perpendicular to the direction of the X-ray beam, the orientation (angular optical) distortion of an Xray image becomes an issue. Because of these flaws the accuracy of measurements is not attainable with the method used by the DX Analyzer.

The present application provides a simplified and automated process for selecting the corners representing an idealized vertebrae body. Once the corners or vertices are established, size, shape, position and other information may then be determined with a high degree of accuracy, inter-examiner reliability and repeatability. The method is first demonstrated for two adjacent vertebrae, 10, 10' of FIG. 1. Initially, an idealized shape is assigned for the subject vertebra, such as a parallelogram (As explained below, a parallelogram cannot be used to represent certain vertebra, in which case other idealized shapes are used).

As discussed above, and illustrated in FIGS. 2-4, vertebrae generally have complex shapes and could be idealized using other shapes, however the present inventor has found that using a parallelogram, such as a square, a rectangle or a rhombus as an idealized shape is particularly advantageous in most instances. For purposes of illustrating the invention, a rectangle has been chosen as the idealized shape for the vertebrae with the exceptions noted below.

As previously mentioned, one problem with existing methodologies for making X-ray images is that while such images are generated or taken, angular three (3) dimensional and scalar distortions are generated in the images which make it difficult to interpret and analyze them correctly. In order to eliminate these distortions, X-ray images are obtained using the apparatus of FIGS. 6 and 7. Appparatus 300 includes a conventional X-ray beam source 302 selectively generating an X-ray beam along axis X-X toward a patient 304. The X-Rays penetrate the patient 304 and the exiting X-rays are captured by an X-ray sensor 306 or other similar means. Some of the dimensions in FIG. 7 are exaggerated for the sake of clarity. The X-ray image from the sensor 306 is provided to a control apparatus 308 which processes it and sends it either on the fly or on demand to a third party at a remote location. Attached to the region of patient's body, e.g., a section of the spine is a positioner 310. The purpose of the positioner is to provide both orientation and size (scale) information relevant to the X-ray images.

Figure 6:
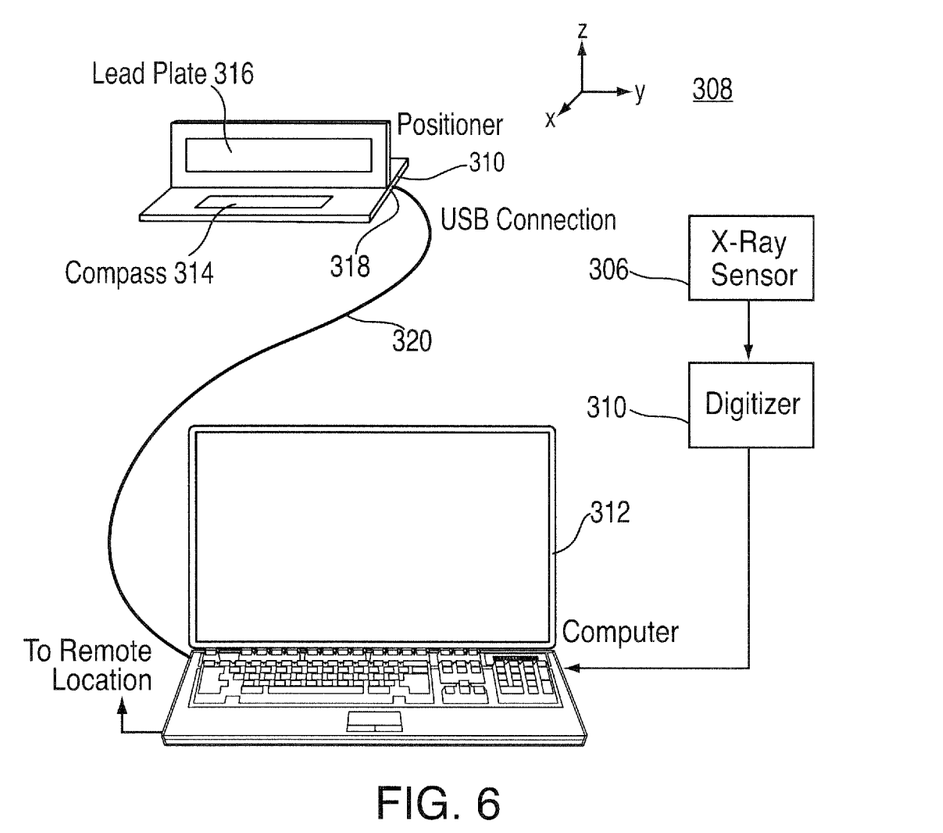
FIG. 6 shows a block diagram the positioner and an apparatus for collecting X-ray images.
Figure 7:
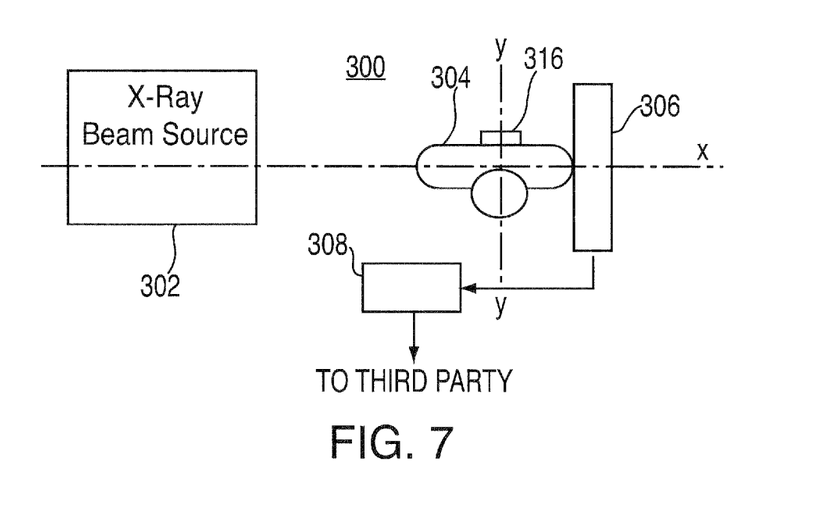
FIG. 7 shows a plan view of an apparatus for taking X-ray images of a person's spine in accordance with the present invention.

As shown in FIG. 6, the controller 308 may include a digitizer 310 that digitizes the image from the x-ray sensor 306, if necessary. The digitized image is received and stored by a microprocessor 312. The microprocessor 312 also receives orientation information indicative of the angular position of the patient 304 with respect to three axes X, Y and Z. For this purpose, the positioner 310 includes a digital compass 314, such as the one made by OceanServer Technologies Inc,. or other similar device. Imbedded or otherwise disposed within the housing of the positioner 310. In addition, also includes a metal plate 316 made of radiological lead or other material opaque to X-rays. Typically, the dimension of plate 316 may be 10 mm by 20 mm by 1.5 mm.

The compass 314 is connected through a USB port 318 and a cable 320 to microprocessor 312. Preferably, the positioner 310 has a T-shaped body made of a plastic material with the plate being disposed in the leg of the T as shown.

Typically in accordance with this invention, a radiologist positions the patient 304 so that he is aligned along axis Y-Y perpendicularly to axis X-X. Preferably, he places the positioned 316 in the vicinity of the vertebrae in question. The compass in the positioned provides readings indicative of the orientation of the patient and the radiologist may (optionally) use this information to check the position of the patient.

The purpose of this invention is to automatically analyze the positions of the vertebrae in a section of the spine and then provide a proper prognosis. The process for accomplishing this is now described.

For each X-ray image required, the radiologist positions the patient as set forth above, applies the positioner to the patient's reference part of spine, positions the patient that the X-ray beam is at perpendicular to the lead plate embedded in the positioned according to the compass data shown on the screen of a computer, adjusts the source 302 so that the beam is collimated and takes the image. The X-ray image is sensed by sensor 306, digitized if necessary and provided to the controller 208. The controller adds other information, such as the orientation of each patient during each image, and other patient ID. A data file with all the images and related information is then transmitted to a remote location.

Figure 8:
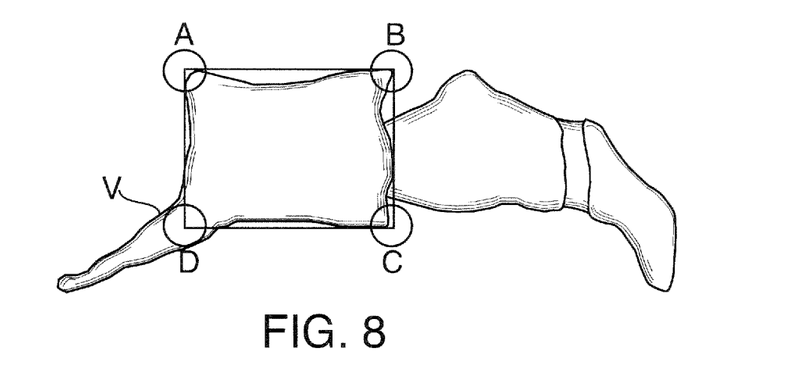
FIG. 8 shows a block diagram of an apparatus for analyzing the X-ray images in accordance with the subject invention.
Figure 9:
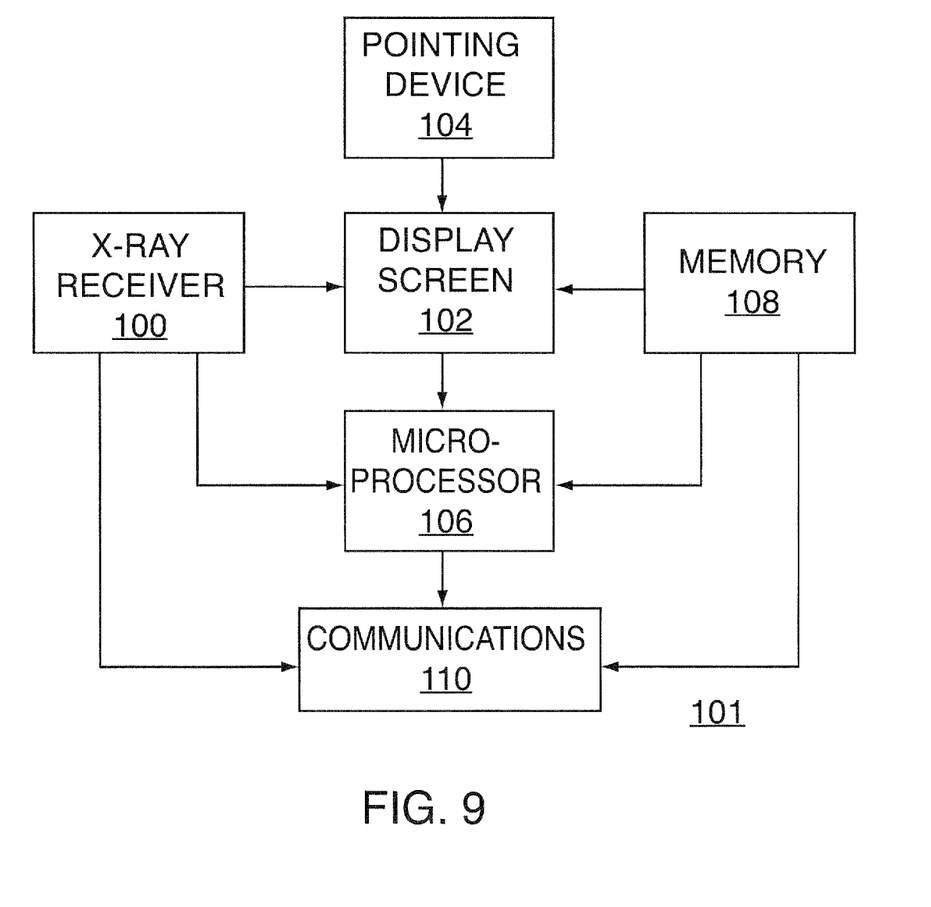
FIG. 9 shows a flow chart for the apparatus of FIGS. 6, 7 and 8.

Referring back to FIG. 1, for the purposes of this invention, the process is now described for two adjacent vertebrae 12, 12' in FIG. 1 and is illustrated further in FIGS. 7, 8 and 9.

More specifically, the goal of the present invention is to quantify motion segments:

(A motion segment consists of two adjacent vertebrae, including the intervertebral disk between them, and the ligaments that bind them together.)

1. Idealize the first vertebra 12 as a rectangle 10 with vertices ABCD;

2. Idealize a second below as a second rectangle 12' with vertices A'B'C'D'.

3. Analyze the two rectangles to detect certain predetermined parameters or spinal characteristics as discussed in more detail below.

Of course, in many instances best results are obtained if more than two vertebrae are analyzed in this manner, however, in the present example, only two vertebrae are discussed for the sake of clarity.

An important part of the methodology is that the points defining a particular vertebra are not all selected manually. Instead, some points are selected manually, while the other points are selected automatically using the manually selected points and the preselected shape for the vertebral body. Additionally, the device guides the operator to follow the proper protocol for points placement and in the event if the points were placed in contrast to the protocol the shape of the drawn vertebra is drawn in particular to show the error was made.

As discussed above, in previous techniques, the operator strives to represent all the body shapes as squares or as proper quadrangles. It is easy to make an error during this process by placing all the points manually since there is no way to place them consistently at the same location to draw a proper quadrangle as discussed above. The error will be shown in the result of the calculation process when the ratio of dynamics of one vertebra over the other needed to be calculated.

In the present invention, the idealized shapes for the vertebra 10, 10' are obtained as follows, using the apparatus shown in FIG. 9. This apparatus 101 includes an X-ray receiver, a display screen 102, a pointing device 104, a microprocessor 106, a memory 108 and a communication device 110.

X-ray images of the spine of a patient are generated by the apparatus of FIGS. 6 and 7 are received by an X-ray receiver 100. (Step 200 in FIG. 10). Initially, this X-ray image is a raw image such as the one shown in FIG. 5 with the top and side surfaces of the vertebrae being distorted due to the fact that the patient may not be oriented properly. The receiver sends raw image together with the angles indicating the angular distortions of the image to the microprocessor 106. The microprocessor reformates the image data to compensate for the distortions and includes the coefficient of distortion in quantification processes. The resulting image is then presented to an operator on screen 102 (step 203). This image is still somewhat raw and very irregular as shown in FIG. 8.

Once the image is presented to an operator, the operator selects three of the four points forming the outline of the idealized shape using a pointing device 104. The pointing device 104 could be a mouse if the image is shown on a passive screen, or could be incorporated into the display screen 102, if an active, touch-sensitive screen is used.

The inventor has analyzed close to 1100 vertebrae and came to several important conclusions.

The first is that the upper side of the rectangle 12 (AB) and the posterior height (the length of segment BC) are the least subjected to any anatomical change (independently of whether the spine is healthy or it suffers from trauma, or other phenomenon) (See FIG. 1).

Therefore, once the image is presented, the operator preferably chooses the positions of points A, B and C (FIGS. 1 and 8) first.

The inventor has found that an operator can be trained in a couple of minutes to perform this task accurately. These points (or, more properly, the coordinates of the points) are fed to a microprocessor 106 which than calculates the point D assuming that the idealized shape is a rectangle and using standard geometric solutions.

The points A, B, C, D are presented on the screen as shown. (In an alternate embodiment, the operator chooses point D as well, (and E, the $5^{th}$, fifth point, which is not necessary) and the microprocessor chooses its own point and presents to the operator so that the operator can check his work, (quality control mechanism). The points for vertebrae 10 are stored into memory 108 and then the shape for the next vertebrae 10' are obtained and analyzed in a similar fashion to determine the positions of points A', B', C' D'. Once the second (if, necessary, third set of points) for second vertebra 10' were obtained, the shapes are compared to determine different characteristics, such as the vertical spacing between the vertebra, their relative angular positions, lateral offset, etc. For example, the lateral offset two vertebra 12, 12' is equal to the lateral distance between lines AD and A'D'. The relative angular positions are represented between the orientations of any two respective lines, e.g, DC and D'C'. The vertical spacing is the distance between some of the respective points, e.g., points D and A', Similar analysis is performed for vertebrae having an approximate triangular or linear shapes, as discussed below. Moreover, for the sake of clarity, the most complicated idealized shape described here is a rectangle, the technique can be readily extended to other idealized shapes having four, five, six sides, etc.

The technique presented above has been presented in a simple format in order to provide a clear understanding of the invention. The technique is used to analyze several vertebrae based on the following rules, and illustrated in FIG. 10

The various individual vertebrae making up the various regions also have specific names or designations well known in the medical field.

1. All vertebrae are divided into groups according to how close they are to the ideal approximations when seen on a lateral X-ray. More specifically, the vertebrae on a spine are assigned the following shapes:

A. Square:

All vertebras, except Occiput and C2

B. Line

Occiput

C. Triangle

C2 Vertebra

Once an X-ray is obtained for the spine of a patient, the X-ray image is presented on the display screen 102 (step 203) and each of the vertebrae is examined in sequence and classified as having one of the idealized shapes as described above by the operator.

Figure 10:
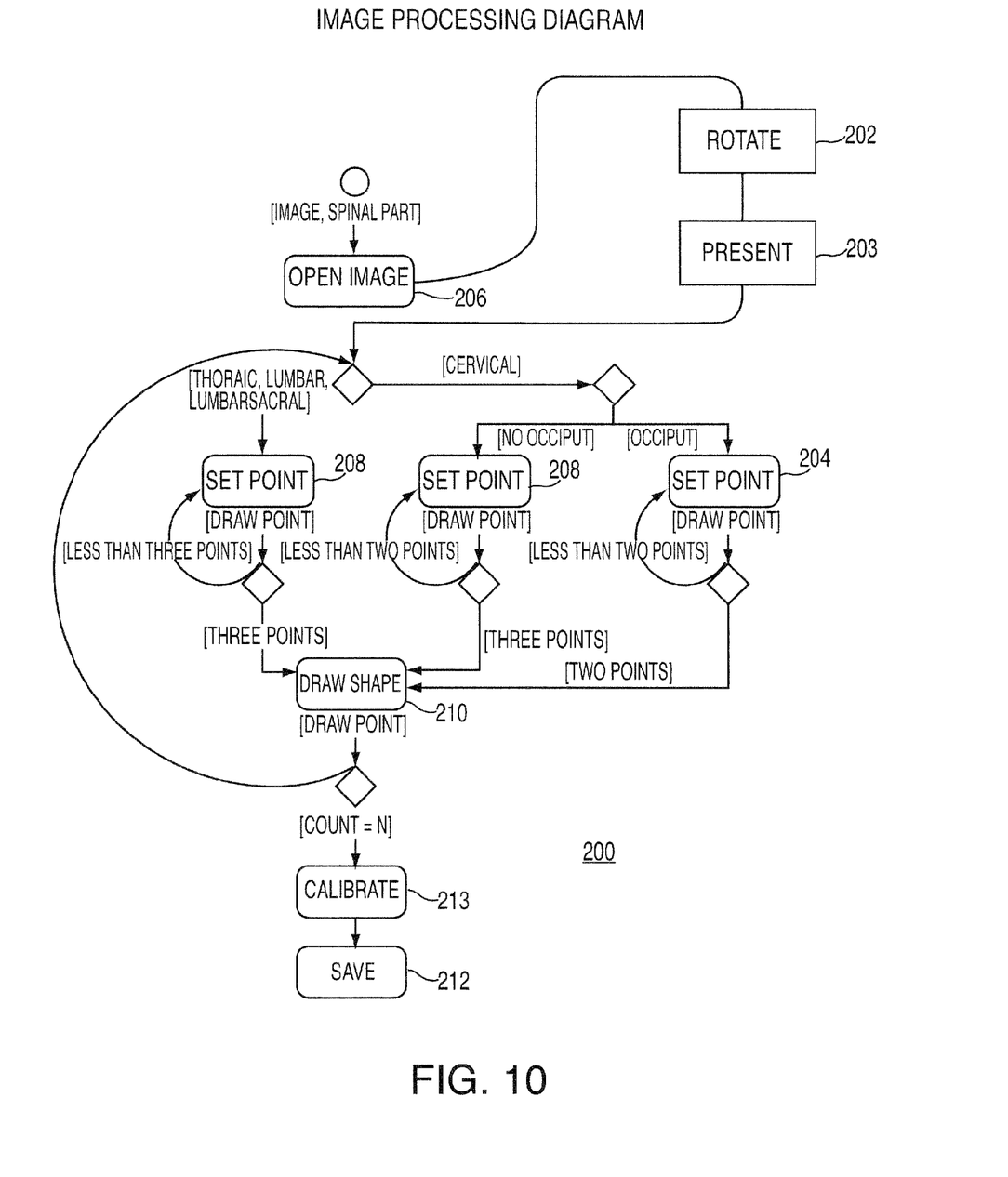
FIG. 10 shows a flowchart illustrating the method of image processing in accordance with the preferred embodiment of the invention.

Cervical vertebrae are analyzed in step 204. For the occiput, only two points are required for a straight line selected by the operator.

For the other vertebra, either three of four points are needed. For the non-occiput cervical vertebrae, the operator selects three points and the forth point is selected automatically (step 206) and for the rest of the vertebra (step 208) three points are selected and one point is automated, as discussed above.

Once the points are defined, the idealized shape for the vertebrae is generated in step 212 and then saved in step 214 so that by the end of the process the characteristics of a particular region or a whole spine is known from the idealized shape and can be analyzed. Preferably, for each patient's spinal part two X-rays are taken: with the patient standing in two different positions, flexion and extension, and the respective X-rays are converted into respective image sets, the sets are processed in a fashion of idealized shapes, as discussed.

During the process of making and then projecting the X-ray images, various optical transformations are taking place as a result of which the final images projected on the display screen 102 are generally difficult to scale properly. In other words, the actual length BC and the distance between two vertebrae are difficult to detect due to film object distance, and respective inborn magnification. In order to solve this problem in the present invention each X-ray image is taken with the positioner in place which, as described above, has a perpendicular lead plate and the image of the plate 316 is visible on an X-ray image as a reference, or target 50, as shown in FIG. 1 and oriented generally in a vertical direction between two points X and Y. The image of target 50 is provided as part of the data to the apparatus of FIG. 9. Points X and Y can be detected as part of the process shown in FIG. 10 either manually or automatically for the microprocessor. The microprocessor can then use the distance L between these two points X and Y (and which is known a priori) to determine a proportional constant that can be used to determine the actual dimensions of the various vertebra shapes. Moreover, the orientation of line XY representing reference target 50 can be used to determine the orientation of the various line segments in FIG. 1 with respect to the corresponding curvature of the back of the patient. The microprocessor geometrically quantifies the coefficient of distortion relative to the X-Y-Z orientation in connection with L between points X and Y and uses this coefficient further as an adjustment optical coefficient for reformatting quantification purposes. In FIG. 10, the various dimensions of the idealized shapes for the vertebra can be calibrated either during one of the intermediate steps, or in step 213 just before the data is saved in step 212.

All of this is important in calculation of alteration of motion segment integrity in human spine (AOMSI). A motion segment consists of two adjacent vertebrae, including the intervertebral disk between them, and the ligaments that bind them together. Once measurements of relationship of one vertebra to another are obtained, they are compared to norms and abnormalities.

The biomechanical data is published by the AMA in the Guides to the Evaluation of Permanent Impairment Sixth Edition and these are the guidelines that are then used to quantify the alteration of motion segment integrity and diagnose patients, mentioned above.

Once the patient's image data is quantified with adjustments for orientation and magnification distortions, the appropriate diagnosis can be established and appropriate treatment protocols instituted.

The patient can be treated better, with better outcomes. For example, patients who have negative pathology and negative AOMSI will not receive treatment, and the insurers will save significant amount of money. The device is the choice for quantifications of motion segment integrity, as described above. It is an AOMSI (alteration of motion segment integrity) specific.

The device is not using the 4$^{th}$ point placed by the operator. It instead uses the 4$^{th}$ point placed by the computer:
a) to conclude the study of the vertebra,
b) show the right order of points placed prior,
c) graphically change incorrect polygon to a correct rectangle to study the angular changes between geometrical figures.

Some of the novel features of our invention include:
1) the order of points placed specific to the spinal vertebra and
2) the utilization of the computer generated 4$^{th}$ point for the above stated reasons in order to receive a tangible result, which is a specific diagnostic impression for treatment plan establishment, quantifications and qualifications for positive and negative AOMSI and, further qualification for impairment ratings according to the Sixth Guides of AMA.

Numerous modifications may be made to the invention without departing from its scope as defined in the appended claims.

I claim:

1. A method for analyzing a spine of a patient comprising the steps of:
    securing a positioner to the spine of the patient, the positioner having a known orientation and size and comprising a compass;
    using the compass of the positioner to position the patient with respect to an X-Ray source such that the patient is positioned along a first axis of the compass and is perpendicular to a second axis of the compass, the first axis being perpendicular to the second axis;
    receiving at least one X-ray of a lateral vertebrae of the spine;
    generating an idealized shape for said vertebrae based on information received from a user;
    determining physical characteristics of said idealized shape; and
    generating a report of said vertebrae based on a set of rules.

2. The method of claim 1 wherein said idealized shape is a polygon.

3. The method of claim 2 wherein said polygon has n vertices, further comprising receiving information from the user indicating the location of n−1 vertices, and calculating the position of the remaining vertex.

4. The method of claim 1 further comprising receiving X-rays of a plurality of adjacent vertebra, generating idealized shapes for each vertebra and generating said report with data describing a relationship between adjacent vertebra.

5. The method of claim 1 wherein said X-ray includes a raw image of a vertebrae, said raw image showing a lateral view oriented at a first angle with respect to a reference axis, further comprising rotating said raw image to eliminate distortions due to said orientation.

6. The method of claim 1 further comprising scaling said X-ray and determining from the scaled X-ray dimensions of said vertebrae.

7. The method of claim 1 wherein said X-ray includes an image of the positioner, the method further comprising a step of adjusting said X-ray image using the image of said positioner.

8. An apparatus for analyzing X-ray images of vertebra of a patient'spine comprising:
    an X-ray source emitting an X-ray beam directed at the patient;
    a positioner secured to the spine of the patient, the positioner having a known orientation and size and comprising a compass with a first axis and a second axis, the first axis being perpendicular to the second axis anti the second axis being calibrated to be parallel to the X-ray beam emitted by the X-ray source, the compass being operable position the patient with respect to the X-ray source such that the patient is located along the first axis of the compass and perpendicular to the second axis of the compass;
    a receiver receiving raw X-ray images;
    a screen presenting said raw X-ray images on a screen;
    a user input receiving information from a user indicative of points of interest on said raw X-ray images;
    a processor configured to convert said raw X-ray images into corresponding idealized shapes for the vertebrae based on said information and to generate a report based on said idealized shapes.

9. The apparatus of claim 8 wherein said processor converts said raw X-ray images into images of idealized shapes having a polygonal shape.

10. The apparatus of claim 9 wherein the image of each vertebrae is converted into an idealized polygon having n vertices.

11. The apparatus of claim 10 wherein said information defines the location of n–1 vertices and the processor determines the position of the n-th vertex for each polygon.

12. The apparatus of claim 8 wherein the processor further receives distortion data indicative of an angular rotation of said raw X-ray images respect to a preselected axis, wherein said processor is further configured to rotate said raw X-ray images to correct for said distortion.

13. The apparatus of claim 8 wherein said processor further receives scaling data indicative of the scale of said vertebra, wherein said processor is further configured to generate said report including information based on the vertebrae sizes.

14. The apparatus of claim 8 wherein said receiver further receives a positioner image in said raw X-ray image, the positioner image being indicative of an actual position of the positioner.

15. The apparatus of claim 14 wherein said processor detects a distortion angle based on said positioner image and rotates said raw X-ray image using said distortion angle.

16. The apparatus of claim 15 wherein said rotation angle includes three components disposed along respective orthogonal axes.

* * * * *